United States Patent [19]

Nagata et al.

[11] Patent Number: 4,745,408

[45] Date of Patent: May 17, 1988

[54] RADIO PAGING SYSTEM AND RECEIVER THEREFOR

[75] Inventors: Koichi Nagata; Takashi Oyagi; Toshihiro Mori, all of Tokyo, Japan

[73] Assignee: NEC Corporation, Tokyo, Japan

[21] Appl. No.: 597,788

[22] Filed: Apr. 6, 1984

[30] Foreign Application Priority Data

Apr. 9, 1983 [JP] Japan .................................. 58-61522
Apr. 9, 1983 [JP] Japan .................................. 58-61523

[51] Int. Cl.$^4$ ........................... G08B 5/22; H04Q 3/02
[52] U.S. Cl. ........................ 340/825.44; 340/825.47; 340/825.48; 455/38; 455/343
[58] Field of Search ............... 340/825.44, 825.47, 340/311.1, 825.48; 455/38, 343

[56] References Cited

U.S. PATENT DOCUMENTS

| | | | |
|---|---|---|---|
| 4,194,153 | 3/1980 | Masaki et al. | 455/343 |
| 4,353,065 | 10/1982 | Mori | 340/825.44 |
| 4,370,753 | 1/1983 | Ehmke | 340/825.48 |
| 4,385,398 | 5/1983 | Wycoff et al. | 340/825.48 |
| 4,398,192 | 8/1983 | Moore et al. | 340/825.48 |
| 4,449,248 | 5/1984 | Leslie et al. | 455/38 |
| 4,479,261 | 10/1984 | Oda et al. | 340/825.44 |

OTHER PUBLICATIONS

"Error-Correcting Codes" by Wesley Peterson, The M.I.T. Press, 1962, pp. 149-152.

Primary Examiner—Robert L. Griffin
Assistant Examiner—Ralph E. Smith
Attorney, Agent, or Firm—Sughrue, Mion Zinn, Macpeak, and Seas

[57] ABSTRACT

A radio paging system, comprising a transmitting base station and a paging receiver with a battery-saving function. The paging receiver operates intermittently at different repetition periods, depending on the call traffic density. When there are fewer calls, the receiver operates less frequently, in order to avoid unnecessary operation and consequent battery drain. When there is a call to be sent, the period between attempted detections of a preamble code word is shortened. The receivers then lengthen the period for detecting a message, and receive a sync code word, followed by an address code word, which alerts the particular receiver being paged, an alert tone being generated. The message ends with a battery saving code word and ending code word. The battery saving code word alerts the receivers to lengthen the period between attempted detections of the preamble code word. The variation in length of periods between attempted detection is a battery-saving feature.

10 Claims, 5 Drawing Sheets

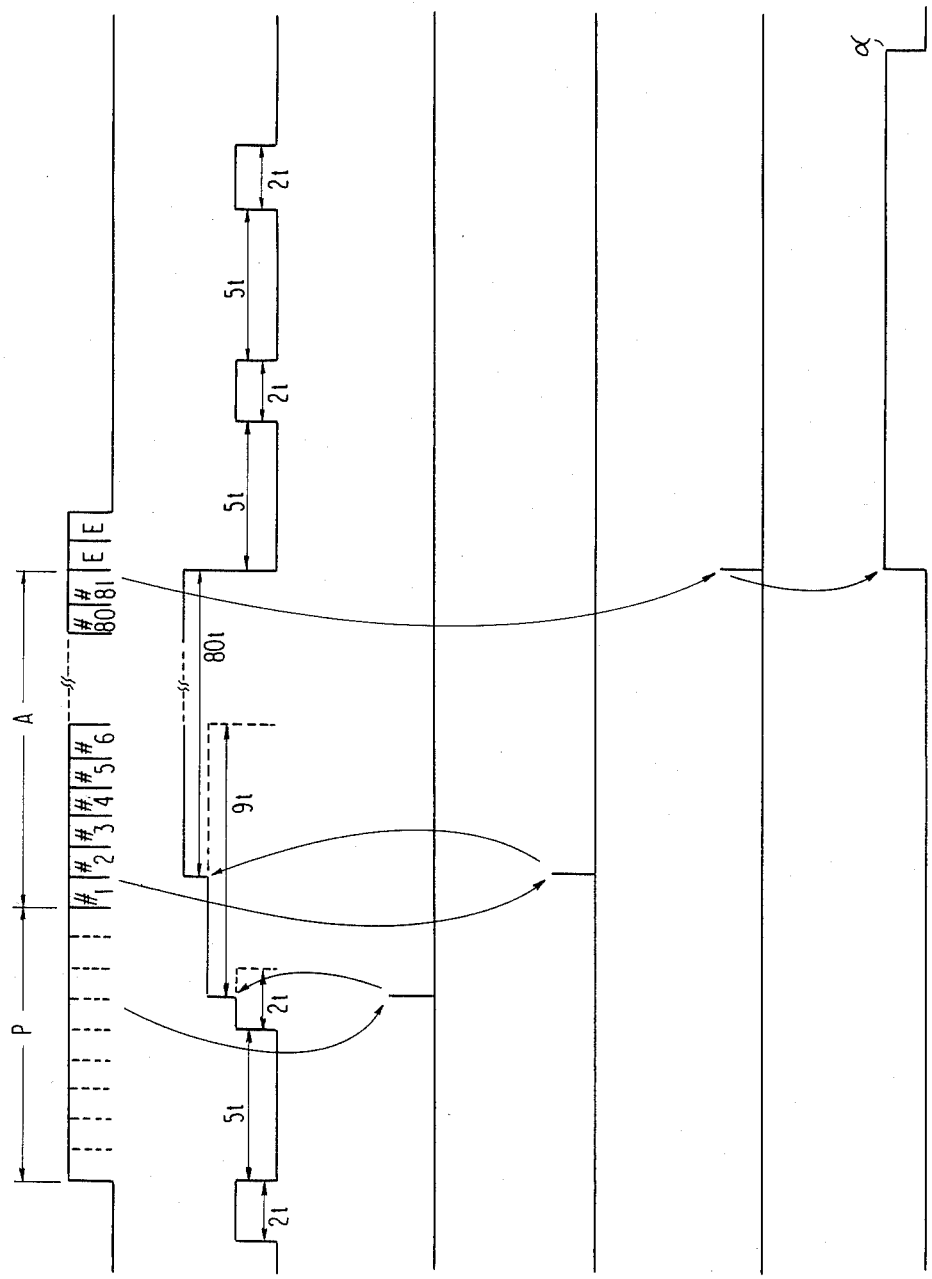

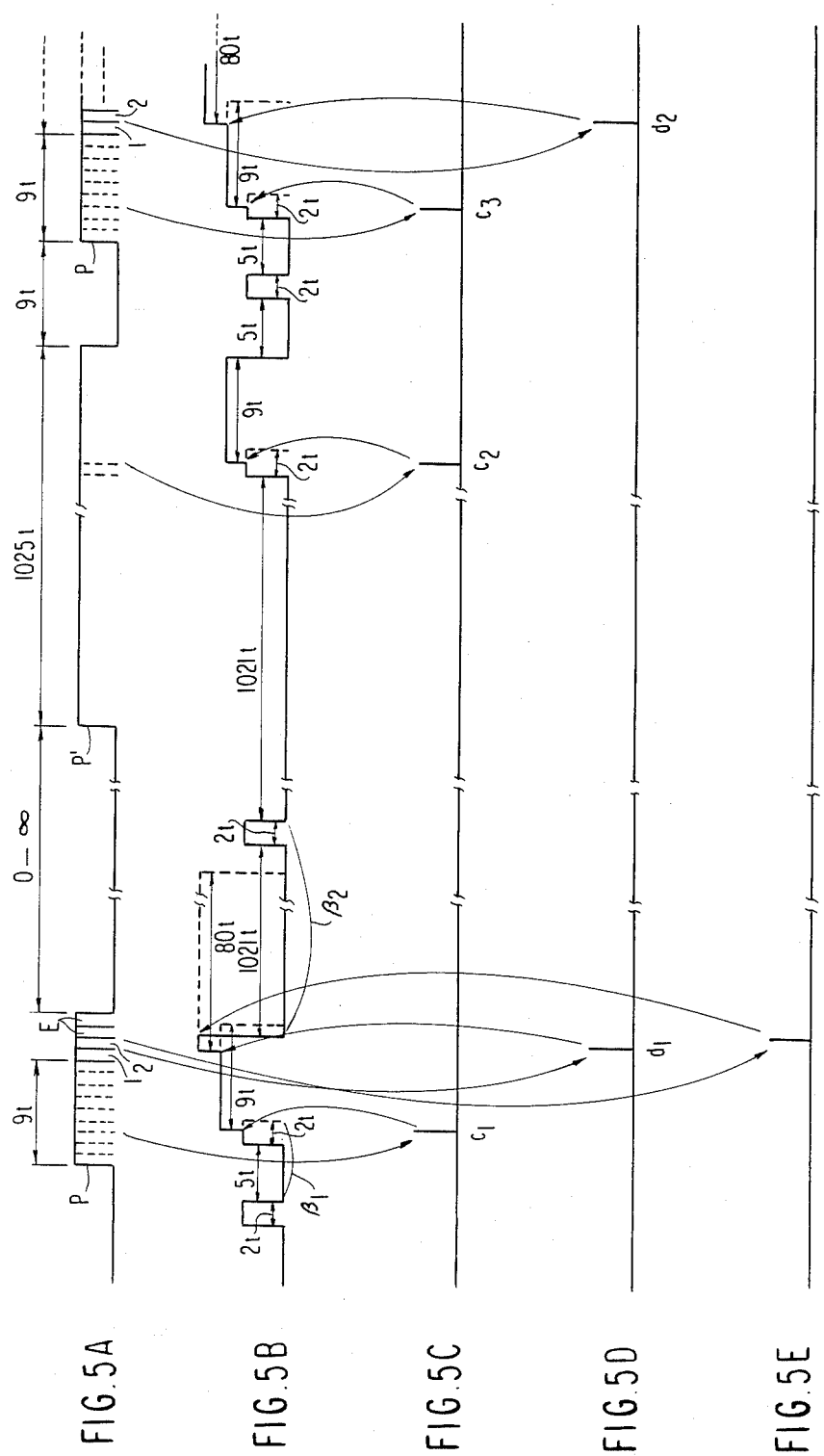

RADIO PAGING SYSTEM AND RECEIVER THEREFOR

BACKGROUND OF THE INVENTION

The present invention relates to a radio paging system, and more particularly to a radio paging system enabling a battery saving function at each of its battery-powered receivers.

Battery saving systems of this kind include the "Digital Radio Paging Communication System" of Masaki et al., disclosed in on U.S. Pat. No. 4,194,153, issued on Mar. 18, 1980 and assigned to the present applicant (now known as NEC Corporation). In the battery saving system proposed by Masaki, a paging receiver intermittently operates at a predetermined first repetition period. When a base station transmits a battery saving release signal lasting longer than the first repetition period, the receiver continuously operates for a duration (longer than the total duration of the battery release signal and the base station's transmitted paging signal) to receive a paging signal. When this time has elapsed, the paging receiver again returns to its original intermittent operation.

In this prior art system, the first repetition period of each paging receiver is usually set so as to process calls adequately when system traffic is at its peak. Even when the base station transmits paging signals much less frequently, as, for example at night, each paging receiver still regularly repeats its intermittent operation, resulting in a waste of receiver battery power. This disadvantage has been handled by turning off the receiver's power supply at night. However, the paging receiver then misses paging signals.

SUMMARY OF THE INVENTION

Therefore, an object of the present invention is to provide a radio paging system capable of reducing the paging receivers power consumption.

Another object of the present invention is to provide a paging system capable of changing the repetition period of the paging receivers' operation depending on call traffic.

Yet another object of the present invention is to provide a paging receiver capable of changing the battery saving periods adapted to the paging system outlined above.

According to the present invention, there is provided a radio paging system, having a base station and a paging receiver, the receiver comprising: means for receiving a first carrier wave which is modulated with a first plurality of preamble codes and one of first address and control codes, and a second carrier wave which is modulated with a second plurality of preamble codes, the first plurality of preamble codes and a second address code, the first plurality of preamble codes being shorter than the second plurality of preamble codes; means for demodulating the first and second carrier waves; means for processing the output of the demodulating means into first and second plurality of preamble codes, first and second address codes, and control code; means for generating first and second control signals having first and second repetition periods, respectively, the first repetition period being shorter than the first plurality of preamble codes and shorter than the second reptition period, the second repetition period being shorter than the second plurality of preamble codes; means for supplying power to a prescribed part of the receiver in response to one of the first and second control signals; and means for supplying the second control signal from the generating means to the power supply means in response to the control code, and for supplying the first control signal from the generating means to the power supply means in response to the second plurality of preamble codes.

BRIEF DESCRIPTION OF THE DRAWINGS

These and other objects, features and advantages of the present invention will become more apparent from the following detailed description read in conjunction with the accompanying drawings, wherein:

FIGS. 4A to 4F are time charts for describing the operation of the paging receiver illustrated in FIG. 3; and FIGS. 5A to 5E are time charts for describing the repetition period switching operation for battery saving by the paging receiver illustrated in FIG. 3.

DETAILED DESCRIPTION OF THE PREFERRED EMBODIMENT

Figure 1:
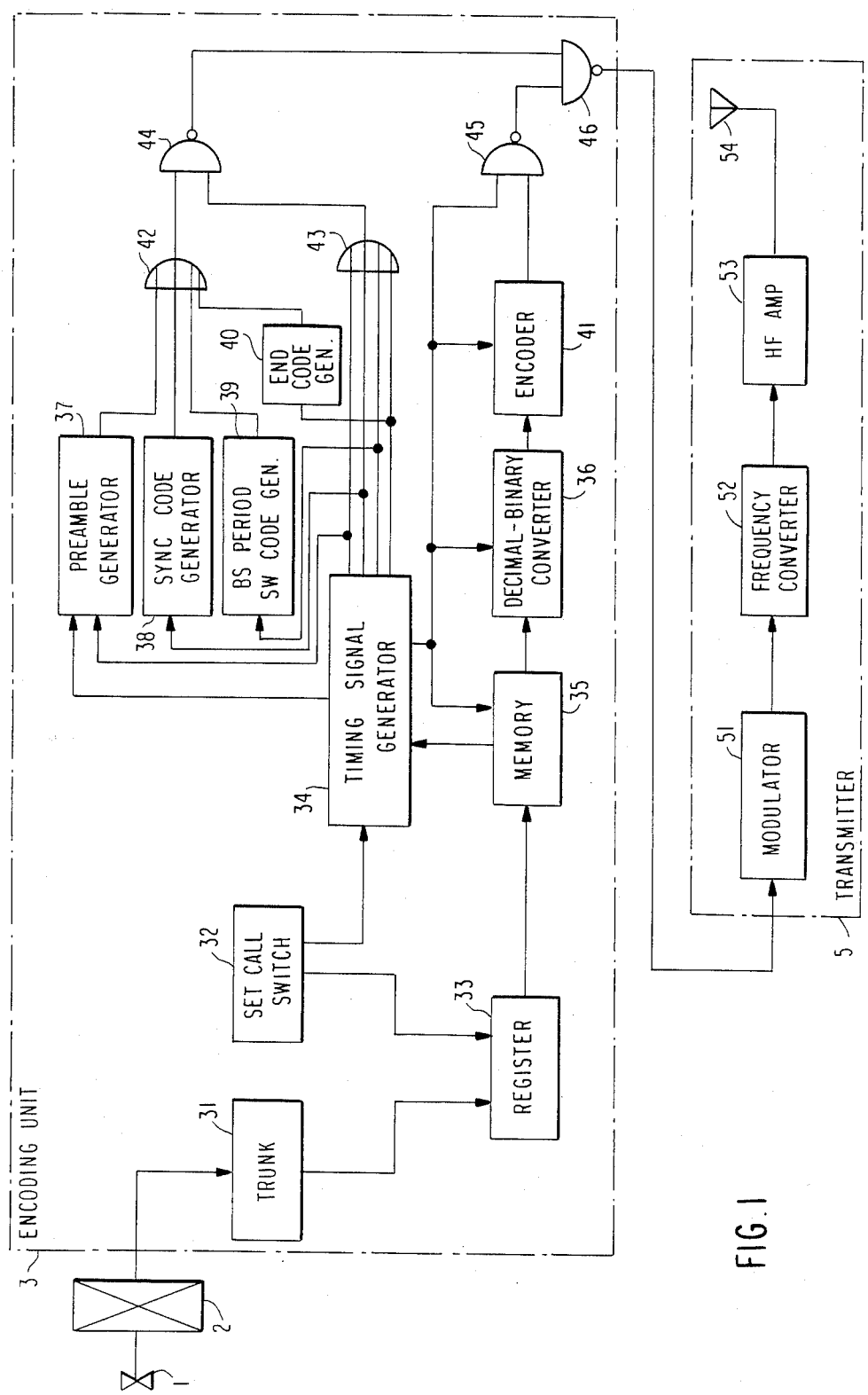
FIG. 1 is a block diagram illustrating an embodiment of the base station of a paging system according to the present invention.

Referring to FIG. 1, a subscriber's telephone set 1 is connected to a trunk 31 in an encoding unit 3 through a telephone exchange 2. A register 33 counts the calling signals received from the trunk 31, and converts a personal paging receiver's call number, transmitted from the calling party's telephone set 1, into a binary-coded decimal (BCD) number. A set call switch 32 permits an operator's manual entry of the receiver's number into the register 33. A memory circuit 35 stores the BCD number coming from the register 33. A BCD converter 36 converts the BCD number, supplied from the memory circuit 35 into a binary code. An encoding circuit 41 adds parity check bits to the output signal from the code converter 36 to provide a cyclic code.

A preamble code generator 37 repeatedly generates a unique word for a predetermined first duration of time (sufficient to repeat the generation 9 times in this instance) or second duration of time to repeat the generation 1,025 times). A sync code generator 38 generates a sync code to follow the unique word. A battery saving period switching (BSPS) code generator 39 generates a BSPS code to follow the sync code. An end code generator 40 generates an end code. A timing signal generator circuit 34 individually controls the circuits 35, 36, 37, 38, 39, 40 and 41, OR gates 42 and 43, and NAND gates 44 and 45, and supplies an encoding unit output through another NAND gate 46, to a transmitter 5. The transmitter 5 comprises an FSK modulator 51, a frequency converter 52, a power amplifier 53 and an antenna 54.

When trying to call a paging receiver (to be described in further detail below), an ordinary telephone subscriber dials on telephone set 1 the call number assigned for the paging receiver. The dial signal is inputted to the trunk 31 via the exchange 2, and further to the register 33. It also is possible for an operator to operate manually the set call switch 32 to enter the call number into the register 33. The register 33, having received a predetermined number of calls (for example, four), transfers to the memory circuit 35 all the call numbers, converted into BCD numbers. The memory circuit 35 keeps the call numbers until a read signal comes from the timing circuit 34. The capacity of the memory circuit 35 in this embodiment is 80 calls.

Figure 2A:
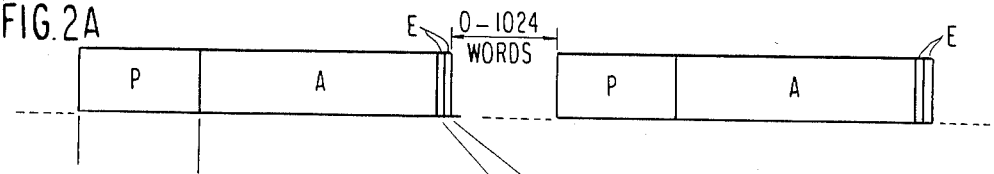
FIGS. 2A to 2H are time charts for describing the operation of the base station illustrated in FIG. 1.
Figure 2B:
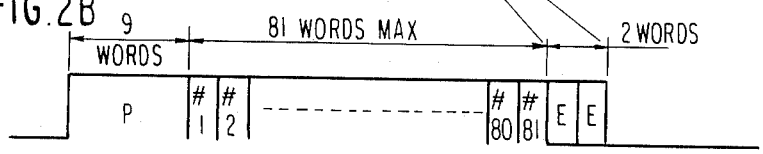
Figure 2C:
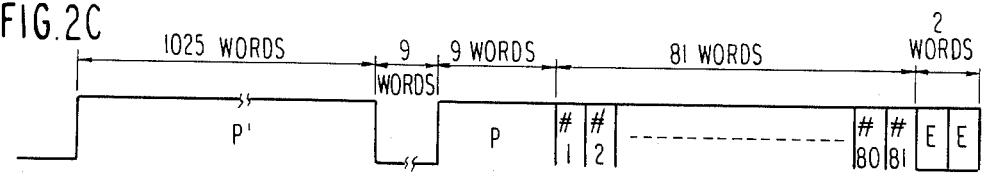
Figure 2D:
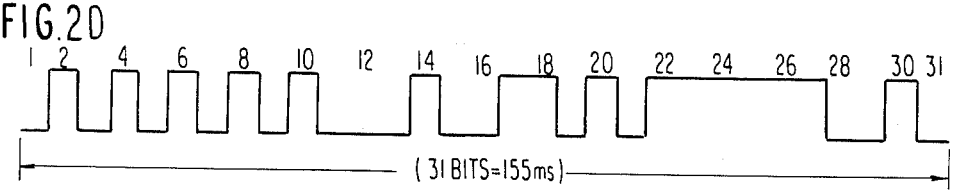

As call numbers are supplied to the memory circuit 35, the timing circuit 34 activates the preamble code generator 37 to supply the preamble code to the transmitter 5 via the OR gate 42 and NAND gates 44 and 46. The preamble code P (See FIG. 2A or 2B) is repeated nine times after,) (i.e., 155 msec×9=1,395 msec), each word (hereinafter called the unique word) consisting of a 31-bit code pattern as shown in FIG. 2D. The preamble code generator 37 has a 31-bit counter (which is activated by the output of the timing circuit 34,) a unique word supply counter, and a read-only-memory (ROM, for instance $\mu$PD501D manufactured and marketed by NEC Corporation) in which the code pattern of FIG. 2D is set in advance. This preamble code generator 37 reads out the contents of the ROM in response to the output of the 31-bit counter, and further repeats the reading of the ROM's contents, the number of repetitions being set by the unique word supply counter. After the (nine-word) preamble code P is supplied, the timing circuit 34 activates the sync code generator 38 to supply the sync code, which consists of the code pattern of FIG. 2E, in the position of word #1 in FIG. 2B. After the sync code is supplied, the timing circuit 34 supplies a read signal to the memory circuit 35, and at the same time activates the code converter 36, the encoding circuit 41, and the NAND gate 45, for at most 80 words (155 msec×80=not more than 12.4 sec,) as shown in FIG. 2B.

Figure 2E:
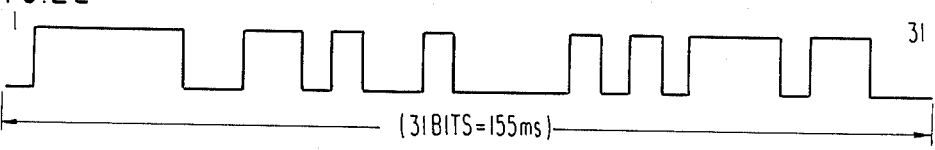
Figure 2F:
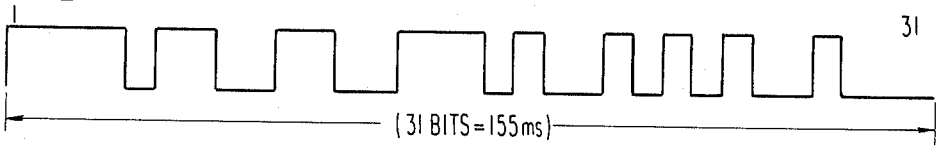
Figure 2G:
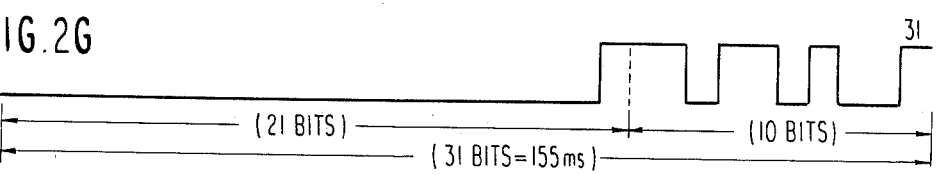
Figure 2H:

If call numbers are stored in the memory circuit 35, these numbers are transferred to the code converter 36 one by one, in the order of their storage, in response to the read signal from the timing circuit 34, until the memory circuit 35 is cleared. The code converter 36 converts BCD numbers into 21-bit binary codes. The encoder 41 adds 10 parity check bits to the 21-bit information codes to supply an address number word representative of a the call number and consisting of the Bose-Chaudhuri Hocqunghen BCH (31, 21) cyclic code, to the transmitter 5 via the NAND gates 45 and 46. An example of code pattern of address number words is shown in FIG. 2G. As illustrated in FIG. 2B at most, 80 address number words, from #2 to #1 in that order, are supplied consecutively. The encoding circuit 41 may be composed of shift registers and adders as described in Wesley Peterson, "Error-Correcting Codes," pp. 149–152 (1962, The M.I.T. Press.) When the memory circuit 35 is cleared, its output is supplied to the timing circuit 34. The timing circuit 34 then suspends the operation of this the circuits 35, 36 and 41, and at the same time activate the end code generator 40 to send the end code E to the transmitter 5 via the OR gates 42 and 43 and the NAND gates 44 and 46, as shown in FIGS. 2A and 2B. The one-word code pattern of the end code E, shown in FIG. 2H, is a pseudonoise (PN) pattern consisting of 31 bits. The end code generator 40, which may be composed similarly to the preamble signal generator 37, repeat the end code E twice (155 msec×2=310 msec).

After the end code generator 40 has supplied code, the timing circuit 34 starts its built-in timer. In this embodiment, this timer is set to 2 minutes and 38.72 seconds (1,024 words×155 msec). If there is a new call number from the memory circuit 35 within this period of time, the timing circuit 34 repeats the foregoing series of actions. The sequence of signals at this time is shown in FIG. 2A.

When the set time has lapsed, the timing circuit 34 acts to change the battery saving repetition period. Thus the timing circuit 34 starts the preamble code generator 37 to supply nine unique words similar to code P in FIG. 2B, and then enables the sync code generator 38 to supply the one-word sync code shown in FIG. 2E. Further, the timing circuit 34 starts the BSPS code generator 39 to supply at least one word of BSPS code consisting of the 31-bit pattern shown in FIG. 2F, and then starts the end code generator 40 to supply two words of the end code of FIG. 2H. The timing circuit 34 generates no output unless a new call number is supplied to the memory circuit 35.

When a new call number is supplied to the memory circuit 35, the timing circuit 34 starts the preamble code generator 37. At the same time, by supplying a unique word supply counter switching signal to the preamble code generator 37 through a connecting line 47, the timing circuit 34 changes from 9 to 1,025 the count of the unique word supply counter within the preamble code generator 37, so that 1,025 unique words (P' in FIG. 2C) are supplied from the preamble code generator 37. After that, the timing circuit 34 suspends signal supply for a nine-word length of time, re-starts the preamble code generator 37, and at the same time changes from 1,025 to 9 the count of the unique word supply counter within the preamble code generator 37 by supplying the unique word supply counter switching signal, so that the signal sequence of FIG. 2B is supplied. The aforementioned signal sequence is illustrated in FIG. 2C. The transmitter 5 transmits through the antenna 54 a carrier wave modulated with an output signal sequence provided from the encoder unit 3.

Figure 3:
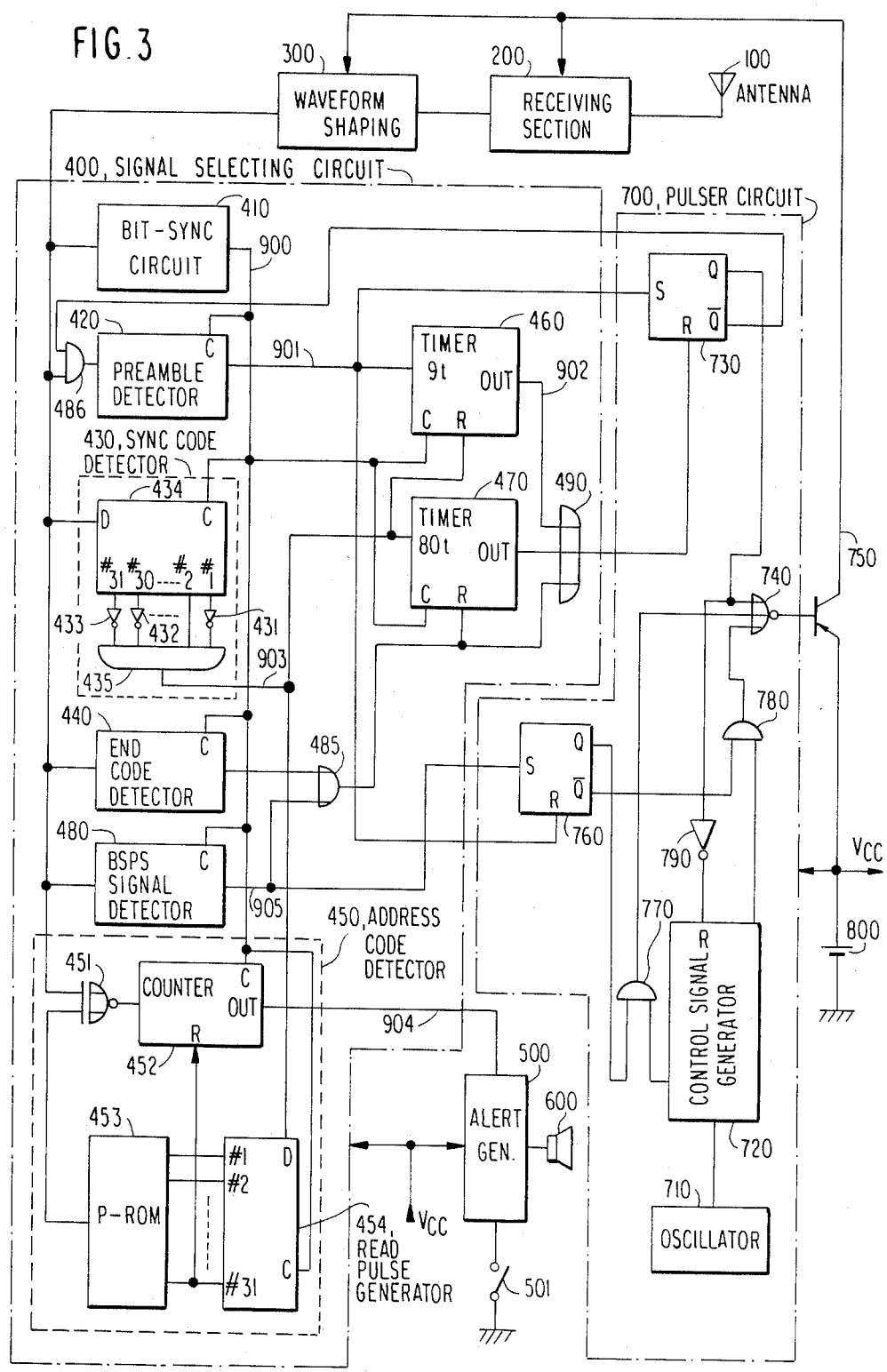
FIG. 3 is a block diagram illustrating an embodiment of a paging receiver for use in the radio paging system according to the present invention.

FIG. 3 is a circuit diagram illustrating a paging receiver according to the present invention. The operation of this receiver will be described below with reference to time charts of FIG. 4.

A modulated carrier wave transmitted from the transmitter 5 on the base station side is picked up by an antenna 100, and received and demodulated by a receiving section 200 to be converted into a baseband signal. This baseband signal is shaped by a waveform shaping circuit 300 into a rectangular wave, which is supplied to a signal selecting circuit 400. These operations are, performed during a period of 2t (where t is one-word length of time) while every part of the receiver is supplied with power. For a subsequent period of 5t, the receiving section 200 and the waveform shaping circuit 300 are not supplied with power. This 2t on/5t off cycle represents one mode of the receiver's battery-saving function, as shown in FIG. 4B, and which will be described below in greater detail.

Now, when the paging receiver receives the modulated carrier wave shown in FIG. 4A, a bit-sync circuit 410 regenerates a clock signal which is bit-synchronized with the demodulated signal, and supplies the clock signal by way of a line 900 to a preamble code detector 420, a sync code detector 430, an end code detector 440 and an address code detector 450. The ouput of the waveform shaping circuit 300 is supplied to one input of the preamble code detector 420 through an AND gate 486. The other input of this AND gate 486 is connected to the $\overline{Q}$ output of a flip-flop (F/F) 730 within a pulser circuit 700. The $\overline{Q}$ output of the F/F 730 is high only when the battery saving function is turned on, but it is low when the function is turned off. Therefore, the signal to the preamble code detector 420 is given only when the battery saving function is on.

Upon detection of the preamble code, the detector 420 provides the detection pulse of FIG. 4C at a connection line 901. The F/F 730 of the pulser circuit 700 is set by this detection pulse, and the Q output of the F/F 730, passing through a NOR gate 740, keeps a switching transistor 750 turned on.

Consequently, power is supplied to all parts of the receiver, so that the receiver's battery-saving function does not operate. Meanwhile, the $\overline{Q}$ output of the F/F 730 becomes low to close the AND gate 486. The pulse, shown in FIG. 4C. of the line 901 also starts a timer 460 which, in response to the clock signal from the line 900, begins counting the time. This timer 460 is set for a period of 9t (the third duration of time), as shown in FIG. 4B.

Now supposing that no sync code (#1 in FIG. 4A) is detected within 9t, a time-out signal is outputted to a line 902 and resets the F/F 730 through an OR gate 490. As a result, the Q output of the F/f 730 becomes low and turns off the switching transistor 750 via the NOR gate 740 to turn on the receiver's battery saving function again. Meanwhile, the $\overline{Q}$ output of the F/F 730 becomes high, and the AND gate 486 opens.

If the sync code (#1 in FIG. 4A) is detected within 9t, a detection pulse, as shown in FIG. 4D, is outputted to a line 903. This detection pulse resets the timer 460 via the line 903, and at the same time causes a timer 470 to start counting. The timer 470 is set so that the fourth duration of time is 80t, as shown in FIG. 4B. After 80t, the switching transistor 750 is turned off, as occurs in the case of the timer 460 after 9t has elapsed, and the receiver's battery-saving function operates again, in the above-mentioned 2t on/5t off cycle.

The circuit structures of the preamble code detector 420, the sync code detector 430 and the end code detector 440 are similar, so the structure of the sync code detector 430 now will be described as representative of the three. The sync code of FIG. 2E is provided to a 31-bit shift register 434. The 31-bit output of the shift register 434 is supplied to an AND gate 435 directly when the corresponding bits of the sync code are "1," and through inverters 431, 432, 433 and so on when the corresponding bits of the same are "0". Only when the 31 bits supplied to the shift register 434 are respectively identical to the 31 bits of the sync code does the AND gate 435 pass a detection pulse (FIG. 4D) through the line 903. The preamble code detector 420, sync code detector 430 and end code detector 440 differ from one another only in the positions of inverters arranged to match the "0" in the code patterns of FIGS. 2D, 2E and 2H.

Next, if the address code of this receiver (supposed to have the code pattern of FIG. 2G) is transmitted from the base station in the position of the #81 word of FIG. 4A, the address code detector 450 will output a detection pulse shown in FIG. 4E over a line 904, and this pulse is supplied to an alert tone generator 500 to activate it. The generator 500 outputs a continuous alert, as shown in FIG. 4F, which drives a speaker 600 to let the receiver's bearer know that s/he is being paged. In FIG. 4F, α indicates a time at which a reset switch 501 is pressed to stop the alert tone.

Now the operation of the address code detector 450 will be described in detail. A sync code detection pulse (See FIG. 4D) at the line 903 activates a read pulse generator 454, comprising a 31-bit shift register, to generate sequentially and cyclically at output terminals #1-31 the read pulses synchronized with the clock signal from the line 900. In a programmable read-only memory (PROM) 453, the address code assigned to the paging receiver is written in advance. The PROM may be of the so-called detachable cord-plug type. First, in response to a read pulse from bit position #1 of the read pulse generator 454, the first bit of the address code stored in the PROM 453 is read out, and supplied to one of the input terminals of a two-input exclusive NOR gate 451. An output from the waveform shaping circuit 300 is supplied to the other input terminal of the gate 451. This gate 451 is open if the two inputs are the same, or closed if they are different. A 31-bit counter 452 counts the pulses when the gate 451 is open. Since the clock signal from the line 900 is supplied to the counter 452, if each respective pair of one of the consecutive bits from the PROM 453 and one of the outputs of the waveform shaping circuit 300 is found by the exclusive NOR gate 451 to be identical the counter 452 will count up sequentially until the 31st bit and, if all the 31 bits are found to be identical will, supply a detection pulse (FIG. 4E) over the line 904. Then the counter 452 is reset by the trailing edge of the read pulse of 31st bit to prepare itself for the next counting.

FIG. 5A shows a modulated carrier wave transmitted from the base station. Unless four call number signals from the telephone exchange 2 (See FIG. 1) are supplied to the encoding unit 3 of the base station within a prescribed length of time (1,024 words' length), the base station's transmitter 5 sends a nine-word (9t) preamble code (P in FIG. 5A), followed by a one-word sync code (1 in FIG. 5A), a one-word battery saving period switching (BSPS) signal (2 in FIG. 5A) and a two-word end code (E if FIG. 5A). After that, the modulated carrier wave emission from the transmitter 5 is suspended until four call number signals are registered in the memory circuit 35 of the encoding unit 3. Upon registration of four address number signals, as described with reference to FIG. 2C, a modulated carrier wave is emitted from the transmitter 5, as shown in FIG. 5A.

The battery saving operation of the paging receiver shown in FIG. 3, corresponding to the modulated carrier wave of FIG. 5A, is represented by FIG. 5B. The receiving section 200 and the waveform shaping circuit 300, regulated by the pulser circuit 700, are repeatedly turning on (for 2t) and off (for 5t) as shown in FIG. 5B. When a preamble code P is detected by code detector 420 while the receiving section 200 and the waveform shaping circuit 300 are within the 2t period when they are on, a detection pulse is generated at point $c_1$ of FIG. 5C. At this time, as described with reference to FIG. 4C, the timer 460 sets a third duration of time 9t as shown in FIG. 5B. A sync code, as described with reference to FIG. 4D, is detected at point $d_1$ of FIG. 5D, and the timer 470 sets the fourth duration of time 80t. Here a battery saving period switching (BSPS) signal 2, shwon in FIG. 5A, is detected by a BSPS signal detector 480 (see FIG. 3), and a detection pulse of FIG. 5E is outputted over the line 905. The pulse on the line 905 resets the timer 470 by way of an OR gate 485, resets the F/F 730 by way of the OR gate 490, and inverts its Q output to below. As a result the switching transistor 750 is turned off via the NOR gate 740. Again the receiver's battery-saving function is thereby rendered operational.

The detection pulse on the line 905 also sets a F/F 760, and inverts the outputs Q and $\overline{Q}$. The outputs $\overline{Q}$ and Q of the F/F 760 are connected to AND gate 780 to keep it closed, and to AND gate 770 to keep it open. A control signal is fed to the other input terminal of the AND gate 770 at a repetition period represented by $\beta_2$ in FIG. 5B, while a control signal is fed to the other input terminal of the AND gate 780 at a repetition period represented by $\beta_1$ in FIG. 5B. These control signals are supplied from a control signal generator 720, which frequency-divides the output of an oscillator 710 to generate the required control signals at the repetition periods $\beta_1$ and $\beta_2$. The pulse to reset and initialize the control signal generator 720 is obtained by inverting the output Q of the F/F 730 with an inverter 790. Consequently, the NOR gate 740 is controlled by the output of the AND gate 770, and repeatedly turns on and off the switching transistor 750 at the repetition period of $\beta_2$. The repetition period $\beta_2$ represents another mode of the receiver's battery-saving function, as will be described below.

When the repetition period is $\beta_2$, power is supplied to all parts of the receiver for 2t; for the following 1021t, power is not supplied to the receiving section 200 and waveform shaping circuit 300. Since the average current of the receiving section 200 and the waveform shaping circuit 300 is 3 mA and that of the signal selecting circuit 400 and the pulser circuit 700 is 150 μA, the average current during the period $\beta_1$ is $$\frac{2t \times 3000 + 5t \times 150}{7t} = 964 \ \mu A$$

During $B_2$, the average current is $$\frac{2t \times 3000 + 1021t \times 150}{1023t} = 155 \ \mu A$$

Accordingly, the amperage for the paging of the present invention is only 16 percent of that involved if there were no switching of repetition period from $\beta_1$ to $\beta_2$.

Then, if a preamble code of 1,025t in time length, represented by P' in FIG. 5A, is transmitted from the base station, the preamble code detector 420 outputs the detection pulse to the line 901 at point $c_2$ in FIG. 5C. The pulse on the line 901 resets the F/F 760 and inverts to outputs Q and $\overline{Q}$. As a result, the AND gate 780 is opened, and the AND gate 770 is closed, the battery saving period changing from $\beta_2$ to $\beta_1$. Since the pulse on the line 901 (at point $c_2$ in FIG. 5C) induces actions similar to those described with reference to point $c_1$ in FIG. 5C, battery saving is suspended for a period of 9t. Because no sync code is detected within this period of 9t as illustrated, the receiver resumes battery saving in response to a time-out signal from the timer 460. A 9t pause is provided between preamble codes P' and P on the base station side to ensure the possibility of suspending battery saving, which might otherwise be impossible if the preamble code P arrives immediately following the code P' within the 9t period during which the receiver is waiting for a sync code.

Next, the processes in which a preamble code P is detected at point $c_3$ in FIG. 5C and a sync code is detected at point $d_2$ in FIG. 5D are the same as in FIGS. 4C and 4D, respectively.

Following an address code, an end code E (see FIG. 2H) is transmitted to let the paging receiver resume battery saving by detecting the end code with the end code detector 440 and resetting the F/F 730 via the OR gates 485 and 490 in response to the end code detection pulse, so that the paging receiver may take no unnecessary receiving action when the address code transmission from the base station is less than 80t.

Athough only the use of the code pattern of FIG. 2D for the preamble code is referred to in the foregoing description of the preferred embodiment, the preamble code can obviously be replaced with any other code different from the sync code, battery saving period switching code, end code, and address code.

It will be readily understood that the period $\beta_2$ can be extended by grouping the paging receivers. The call number capacity is the 21st power of 2 (equal to 2097152) because the call number code has 21 information bits, as shown in FIG. 2G. For example, these 2097152 different call numbers can be grouped into 200 groups, each of which has 10,000 call numbers and is headed with a preamble code unique thereto. In such a grouped number system, the encoding unit comprises a sorter provided between the trunk 31 and the register 33 (See FIG. 1) with which the call numbers are sorted into prefixed groups. For each group, the encoding unit includes the register 33, the decimal-binary converter 36 and the encoder 41 (See FIG. 1). The encoding unit also comprises a transmission sequence arranging circuit following the NAND gate 46 to arrange the encoded group paging codes from the encoders 41 to a paging code. On the other hand, each paging receiver which is in a given group, has to have a preamble code detector unique to the given group. Although this unique preamble code detector makes the paging receiver design somewhat complex, composing the decoder of a PROM of the code-plug type in the same manner as the address code detector 450 (FIG. 3) will simplify the design, and if these preamble and address code detectors are placed in a single PROM, the design will be even simpler.

As described earlier, the radio paging system according to the present invention sets more than one duration and repetition period for battery saving pulses for the paging receiver, resulting in the reduction of the paging receiver's power consumption. In addition, the power switch of the paging receiver can be eliminated so that the receiver is more compact and is easier to operate.

What is claimed is:

1. A radio paging system having a paging receiver, said receiver comprising:
   means for receiving a remotely-generated carrier wave which is modulated with either a first or a second plurality of preamble codes, in accordance with a volume of call traffic, and with one of an address and a control code, said first plurality of preamble codes being shorter than said second plurality of preamble codes;
   means for demodulating said carrier wave;
   means for processing the output of said demodulating means into said first and second pluralities of preamble codes, said address code, and said control code;
   means for generating first and second control signals having first and second repetition periods, respectively, said first repetition period being shorter than said first plurality of preamble codes and shorter than said second repetition period, said second repetition period being shorter than said second plurality of preamble codes means for intermittently supplying power to a prescribed part of said receiver at either said first repetition period or said second repetition period in response to a corresponding one of said first and second control signals; and means for supplying said second control signal from said generating means to said power supply means in response to said control code, and for supplying said first control signal from said generating means to said power supply means in response to said second plurality of preamble codes, wherein said power supply means supplies power to said receiver at either said first repetition period or said second repetition period in accordance with a volume of call traffic.

2. A radio paging system as claimed in claim 1, further comprising means for selectively transmitting one of said carrier wave modulated with said first plurality of preamble codes and with said control code and said carrier wave modulated with said second plurality of preamble codes, depending on whether the number of paging calls within a given period of time exceeds a predetermined number.

3. A radio paging system as claimed in claim 2, wherein said predetermined number is four.

4. A radio paging system as claimed in claim 1, wherein said prescribed part of said receiver comprises said receiving and demodulating means.

5. A radio paging system as claimed in claim 1, said receiver further comprising means for generating an alert tone in response to said address code after it has been processed.

6. A method, adapted to a radio paging system, for switching the repetition period of intermittent receiver-energizing pulses depending on whether the number of calls exceeds a predetermined number, said method comprising the following steps:

supplying power to a prescribed part of a paging receiver at a first repetition period;

receiving a control code from a remotely located station when said prescribed part is supplied with one of said receiver-energizing pulses at said first repetition period;

in response to the control code, changing the repetition period of said receiver-energizing pulses from said first repetition period to a second repetition period longer than said first repetition period;

receiving a preamble code from the remotely located station when said prescribed part is supplied with said receiver-energizing pulses at said second repetition period; and in response to the preamble code, changing the repetition period of said receiver-energizing pulses from said second repetition period to said first repetition period, wherein said control code and said preamble code are generated from the remotely located station in accordance with a volume of call traffic.

7. In a paging receiver for use in a radio paging system for the transmission and reception of messages, said receiver permitting power to supplied intermittently to prescribed parts of said receiver, the improvement comprising:

first means, responsive to a remotely-generated battery saving period switching signal, for changing the frequency of said intermittent supply of power from a first repetition period to a second repetition period, longer than said first repetition period, when there are no more messages to be received; and second means, responsive to a remotely-generated preamble code signal, for changing said intermittent supply of power from said second repetition period to said first repetition period when said receiver has been idle for longer than a preset duration of time and there are messages to be received.

8. A paging receiver as claimed in claim 7, wherein said prescribed parts of said receiver comprise means for receiving and demodulating radio signals.

9. In a base station for use in a radio paging system for the transmission and reception of messages, said radio paging system including a plurality of paging receivers permitting power to be supplied intermittently to prescribed parts of each of said paging receivers, the improvement comprising:

first means for generating a battery saving period switching signal, for changing the frequency of said intermittent supply of power to each of said paging receivers from a first repetition period to a second repetition period, longer than said first repetition period, when there are no more messages to be received; and second means for generating a preamble code signal, for changing said frequency of said intermittent supply of power to each of said paging receivers from said second repetition period to said first repetition period when said receivers have been idle for longer than a preset duration of time and there are messages to be received.

10. A base station as claimed in claim 9, further comprising means for generating a plurality of different preamble code signals, each of said different preamble code signals causing an output within a different group of said paging receivers changing said frequency of said intermittent supply of power of said group of said paging receivers within said plurality of paging receivers from said second repetition period to said first repetition period when said group of receivers have been idle for longer than a preset duration of time and there are messages to be received.

* * * * *

UNITED STATES PATENT AND TRADEMARK OFFICE
CERTIFICATE OF CORRECTION

PATENT NO. : 4,745,408
DATED : May 17, 1988
INVENTOR(S) : Nagata et al

It is certified that error appears in the above-identified patent and that said Letters Patent is hereby corrected as shown below:

| | |
|---|---|
| COLUMN 3, LINE 42 | Delete "cncoder" and insert --encoder--. |
| COLUMN 3, LINE 45 | Delete "Hocqunghen", insert --Hocquenghem--. |
| COLUMN 3, LINE 49 | Delete "#1" and insert --#81--. |
| COLUMN 4, LINE 50 | Delete "2t" and insert --2$\underline{t}$-. |
| COLUMN 4, LINE 50 | Delete "t" and insert --$\underline{t}$--. |
| COLUMN 4, LINE 52 | Delete "5t" and insert --5$\underline{t}$-- |
| COLUMN 4, LINE 54 | Delete "2t" and "5t" and insert --2$\underline{t}$- and --5$\underline{t}$-. |
| COLUMN 4, LINE 64 | Delete "ouput" and insert --output--. |
| COLUMN 5, LINE 19 | Delete "9t" and insert --9$\underline{t}$-. |
| COLUMN 5, LINE 22 | Delete "9t" and insert --9$\underline{t}$-. |
| COLUMN 5, LINE 24 | Delete "F/f" and insert --F/F--. |
| COLUMN 5, LINE 30 | Delete "9t" and insert --9$\underline{t}$-. |
| COLUMN 5, LINE 35 | Delete "80t" (both instances) and insert --80$\underline{t}$-- (both instances). |

UNITED STATES PATENT AND TRADEMARK OFFICE
CERTIFICATE OF CORRECTION

PATENT NO. : 4,745,408

DATED : May 17, 1988

INVENTOR(S) : Nagata et al

It is certified that error appears in the above-identified patent and that said Letters Patent is hereby corrected as shown below:

| | |
|---|---|
| COLUMN 5, LINE 37 | Delete "9t" and insert 9-9$\underline{t}$-. |
| COLUMN 5, LINE 39 | Delete "2t" and "5t" and insert --2$\underline{t}$-- and --5$\underline{t}$--. |
| COLUMN 6, LINE 35 | Delete "(9t)" and insert --(9$\underline{t}$)--. |
| COLUMN 6, LINE 51 | Delete "2t" and "5t" and insert --2$\underline{t}$-- and --5$\underline{t}$--. |
| COLUMN 6, LINE 54 | Delete "2t" and insert --2$\underline{t}$--. |
| COLUMN 6, LINE 57 | Delete "9t" and insert --9$\underline{t}$--. |
| COLUMN 6, LINE 61 | Delete "80t" and insert --80$\underline{t}$--. |
| COLUMN 6, LINE 62 | Delete "shwon" and insert --shown--. |
| COLUMN 7, LINE 25 | Delete "2t" and "1021t" and insert --2$\underline{t}$-- and --1021$\underline{t}$--. |
| COLUMN 7, LINE 42 | Delete "1,025t" and insert --1,025$\underline{t}$--. |
| COLUMN 7, LINE 52 | Delete "9t" and insert --9$\underline{t}$--. |
| COLUMN 7, LINE 54 | Delete "9t" and insert --9$\underline{t}$--. |
| COLUMN 7, LINE 55 | Delete "9t" and insert --9$\underline{t}$--. |

UNITED STATES PATENT AND TRADEMARK OFFICE
CERTIFICATE OF CORRECTION

PATENT NO. : 4,745,408

DATED : May 17, 1988

INVENTOR(S) : Nagata et al

It is certified that error appears in the above-identified patent and that said Letters Patent is hereby corrected as shown below:

COLUMN 7, LINE 60   Delete "9t" and insert --9$\underline{t}$--.

COLUMN 8, LINE 5   Delete "80t" and insert --80$\underline{t}$--.

Signed and Sealed this

Fifteenth Day of November, 1988

Attest:

DONALD J. QUIGG

Attesting Officer

Commissioner of Patents and Trademarks